Patented July 29, 1924.

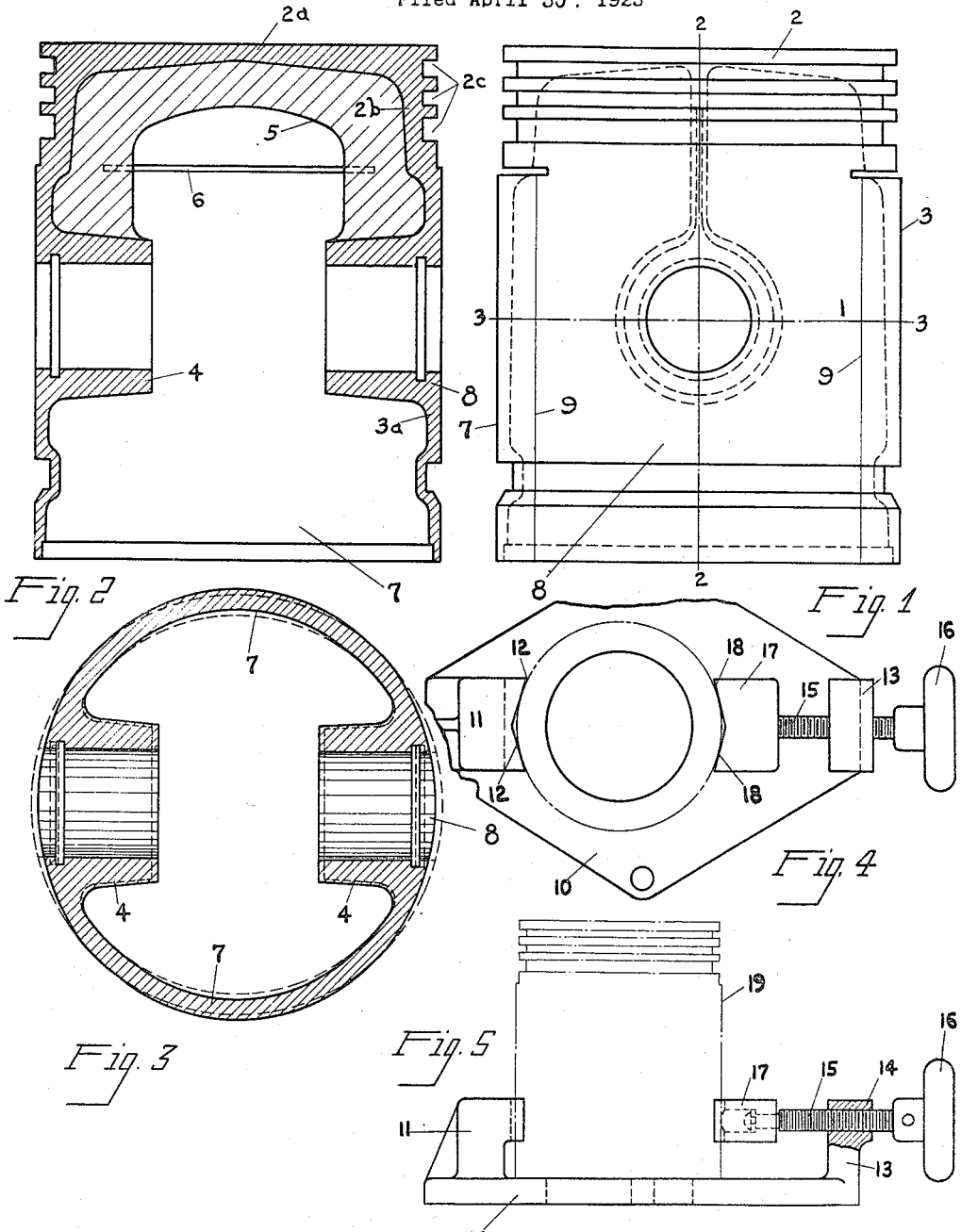

1,502,765

UNITED STATES PATENT OFFICE.

MARTIN B. COVERT, OF INDIANAPOLIS, INDIANA.

METHOD OF FITTING PISTONS.

Application filed April 30, 1923. Serial No. 635,480.

*To all whom it may concern:*

Be it known that I, MARTIN B. COVERT, a citizen of the United States, residing at Indianapolis, in the county of Marion, State of Indiana, have invented a certain new and useful Improvement in Methods of Fitting Pistons, of which the following is a specification, reference being had therein to the accompanying drawings.

This invention relates to engine pistons and to methods of fitting the same into engine cylinders. In general it relates to a method of adjusting the diametrical length of a piston across the bearing portions thereof to conform operatively with the cylinder in which the piston is to reciprocate. In particular it relates to a method of altering the diametrical length of a piston across its bearing portions by the application of force to the piston skirt.

It further relates to a method of fitting to a cylinder a piston which has a bearing portion of the skirt separated from direct attachment to the head and which is composed of a metal capable of taking a permanent set.

It further relates to a method of fitting a piston casting to a cylinder which comprises machining the casting approximately to the desired size, severing the bearing portions of the skirt from direct connection with the head and applying force to the skirt to lengthen or shorten, as desired, the diameter across the bearing portions.

The various objects of my invention will appear from the foregoing and the following specifications and drawings wherein an apparatus for practicing my improved method and a product of this method is shown in connection with a disclosure of the process.

In the drawing Fig. 1 is the side elevation of a piston constructed in accordance with my invention.

Fig. 2 is a cross-sectional view taken on line 2—2 of Fig. 1.

Fig. 3 is a cross-sectional view taken on line 3—3 of Fig. 1.

Fig. 4 is a fragmental top plan view of an apparatus suitable for use in practicing my invention.

Fig. 5 is a view in side elevation of the apparatus shown in Fig. 4 but with a piston in operative position thereon.

Referring to the drawings, 1 designates a piston of the type commonly employed in internal combustion engines comprising a head 2 and a skirt 3, the head being formed of a substantially circular disc $2^a$ with a depending ring flange $2^b$ in which are formed grooves $2^c$ suitable for piston rings (not shown).

The skirt 3 comprises a substantially cylindrical shell $3^a$ to the interior of which wrist pin bosses 4 are integrally united. The skirt 3 and ring flange $2^b$ of the head are preferably connected integrally at points adjacent to bosses 4, and if desired, additional connecting and strengthening means may be employed, such as an inwardly extending rib 5 connected to the bosses, skirt and head as shown or any of them.

Slots 6 which extend through the wall of the piston partially separate the head from the skirt. These slots are preferably arranged at substantially diametrically opposite points and between the head and the bearing portions 7 of the skirt. In this manner the bearing portions of the skirt are not connected directly to the head but on the contrary are indirectly connected therewith through the medium of the other or boss carrying portions 8 of the skirt.

I have found that by applying force to the skirt of a piston formed substantially as described above, the diametrical dimensions of the skirt can be altered or varied, as desired, within certain limits. For example, the application of force to the skirt shown in Fig. 3 along the diameter joining the bosses will have the effect of altering the length of the diameter of the skirt at substantially right angles to the diameter joining the bosses. If the force applied is compressive, the diameter at right angles to the bosses, or, in other words, across the bearing portions will be lengthened, while if the force is applied outwardly, the diameter across the bearing portions will be decreased. Similarily the application of inwardly directed force along the diameter of the bearing portions will cause a shortening of this diameter and a corresponding lengthening of the diameter at right angles thereto which is the diameter joining the bosses.

In Fig. 3 I have shown in full lines the relative position which may be assumed by the different portions of a piston skirt when the same has been subjected to inwardly directed force along the diameter joining the bosses, the dotted lines indicating approximately the shape of the piston before the application of such force and the full lines the position of parts after the application of force. It will, of course, be understood that the dotted and full lines indicate roughly and greatly exaggerated amounts of movement of the piston portions, this being done to illustrate the invention more clearly. In actual practice the amount of shortening or lengthening of a diameter would be measured in thousandths of an inch.

Figs. 4 and 5 show a device which may be employed for altering the diametrical dimensions of the skirt of a piston in the manner indicated in Fig. 3.

My improved method of fitting a piston to a cylinder may conveniently be practiced as follows:—

After the piston casting has been machined approximately to size, slots are formed through the wall of the piston between the head and skirt and preferably between the head and bearing portions of the skirt substantially as shown in Figs. 1 and 2. Then the diameter of the skirt across the bearing portions 5 is altered until it is of the length desired for the cylinder in which the piston is to reciprocate, which alteration is made in one of several ways. Inwardly directed force applied to the diameter of the piston joining the bosses or outwardly directed force applied along the diameter across the bearing portions will lengthen the diameter across the bearing portion, and inwardly directed force applied along the diameter of the bearing portions or outwardly directed force along the diameter joining the bosses will shorten the diameter across the bearing portions.

I have found that in pistons having a slot between the head and bearing portions of the skirt, or an indirect connection of the head to the bearing portions, as through the other portions of the skirt, there is a tendency of the piston to move the boss carrying portions or those portions having direct connection to the head, radially outward as it becomes heated in operation in a cylinder. Accordingly to permit such movement I relieve the exterior of the skirt in the region of the bosses for several thousandths of an inch or sufficiently so that the piston will not seize in the cylinder at such points when in use. Such reliefs may extend for the full length of the skirt and from each boss to or beyond the adjacent ends of the slots 6 as is indicated approximately by lines 9 on Fig. 1. It is to be understood that more relief may be used if desired, even to the extent of forming the reliefs when casting the piston, or depressing the skirt wall about the extremity of the bosses, as is well known in the art.

In the form of piston shown this relief may amount to from about five to about fifteen thousandths of an inch on either side of the piston.

When the diameter across the bearing portions is to be shortened, care should be exercised to insure adequate relief adjacent each boss to prevent seizure of the boss carrying wall portions in the cylinder.

I have found that when force is applied temporarily or for a short time to pistons as outlined above, the metal may be permanently distorted, or in other words, the skirt will acquire a permanent set, which will not be effected by heating or cooling of the piston in use. This is true, I believe, of practically all piston materials but especially it is true of aluminum alloys.

Thus, when a piston has had its diametrical dimensions altered as desired and has taken a permanent set it will retain the new or distorted form under conditions of ordinary use and until again distorted by a new application of a distorting force.

In Figs. 4 and 5 where one form of device for distorting the skirts of pistons according to my method is shown, 10 indicates a substantially flat plate having an upstanding boss 11 at one side thereof formed with a surface or surfaces 12 substantially perpendicular to the top surface of plate 10. At the opposite side of plate 10 is located another upstanding lug 13 having a horizontally disposed screw threaded opening 14 extending throughout, in which is mounted a screw 15 having a hand wheel 16 at the outer side thereof and a head 17 rotatably mounted on the inner end of the screw, preferably provided with surface 18 similar to surface 12 on lug 11 and arranged at right angles to the top surface of plate 10. A piston 19, indicated diagrammatically in these figures, when resting upon the top surface of plate 10 may thus be engaged on diametrical opposite sides of the skirt between lug 11 and head 17 and compressed therebetween when the hand wheel and screw 15 are rotated in lug 13.

While I have shown two slots 6 in the embodiment here illustrated, much the same mode of operation and the same results are obtained if only one such slot is employed and I desire it to be understood that my invention contemplates also the use of only a single slot or severance such as slot 6 wherever such construction will attain substantially the objects and advantages of my invention.

It will be noted that this specification is directed to an invention relating to the fitting of pistons to cylinders and that the claims herein relate to such a method, no claims being presented herein to the structure or configuration of a piston on which my present invention may be practiced. However, in my copending application, Serial No. 442,989 filed Feb. 7, 1921, I have claimed the structure and configuration of a piston to which the present claimed method is applicable.

Having thus described my invention, what I desire to secure by Letters Patent is defined in what is claimed, it being understood, however, that various changes or modifications may be made in the particular employment of my invention disclosed herein by those skilled in the art which do not amount to invention without departing from the scope of my invention.

What is claimed is:

1. The method of fitting a piston to a cylinder which comprises forming diametrically disposed slots through the piston between the head and skirt, and applying force to the piston skirt along a diameter thereof to lengthen the diameter at substantially right angles thereto.

2. The method of fitting a piston to a cylinder which comprises forming oppositely disposed circumferentially extending slots through the piston between the head and skirt and applying external force to the skirt along a diameter thereof to alter the diametrical dimension thereof at right angles thereto.

3. The method of fitting a piston to a cylinder which comprises severing the bearing portions of a piston skirt from direct connection with the piston head, applying external force temporarily to the skirt to alter the diametrical length across the bearing portions and to give the skirt a permanent set.

4. The method of fitting a piston casting to a cylinder which comprises machining the skirt to approximately the desired diametrical length across the bearing portions thereof, forming a slot through the piston between each bearing portion and the piston head, and compressing the skirt diametrically to produce the desired diametrical length across the bearing portions and to give the skirt a permanent set.

5. The method of fitting a piston to a cylinder which comprises relieving the exterior surface of the piston skirt adjacent to the bosses, forming a slot through the piston wall between the head and bearing portions of the skirt, applying force to the skirt along the diameter joining the bosses to alter the diametrical length across the bearing portions thereof, and giving the skirt a permanent set.

6. The method of fitting to a cylinder a piston having the exterior surfaces thereof relieved adjacent to the bosses and having the bearing portions of the skirt separated from direct contact with the head of the piston which comprises applying an external force to the skirt along the diameter joining the bosses to increase the diametrical length across the bearing portions and to give the skirt a permanent set.

7. The method of fitting to a cylinder a piston having the exterior surface thereof relieved adjacent to the bosses and also having the bearing portions separated from direct contact with the wall portion of the piston head which comprises applying a distorting force temporarily to the exterior of the bearing portions of the skirt to decrease the diametrical length across the bearing portions, to increase the diametrical length across the bosses and to give the piston a permanent set.

In testimony whereof, I hereunto affix my signature.

MARTIN B. COVERT.